United States Patent
Broulidakis et al.

(10) Patent No.: US 10,087,785 B2
(45) Date of Patent: Oct. 2, 2018

(54) MID-TURBINE FRAME ASSEMBLY FOR A GAS TURBINE ENGINE

(71) Applicant: UNITED TECHNOLOGIES CORPORATION, Hartford, CT (US)

(72) Inventors: Alexander Broulidakis, Tolland, CT (US); Anthony P. Cherolis, Hartford, CT (US); Jonathan Lemoine, Vernon, CT (US); Kalpendu J. Parekh, Colchester, CT (US); Steven W. Trinks, Wallingford, CT (US); Christopher Treat, Manchester, CT (US); Kevin Zacchera, Glastonbury, CT (US); Alberto A. Mateo, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 645 days.

(21) Appl. No.: 14/617,323

(22) Filed: Feb. 9, 2015

(65) Prior Publication Data

US 2016/0230602 A1    Aug. 11, 2016

(51) Int. Cl.

| F01D 25/28 | (2006.01) |
|---|---|
| F01D 9/06 | (2006.01) |
| F01D 25/16 | (2006.01) |
| F02C 7/12 | (2006.01) |
| F01D 25/26 | (2006.01) |

(52) U.S. Cl.
CPC .............. *F01D 25/28* (2013.01); *F01D 9/065* (2013.01); *F01D 25/162* (2013.01); *F01D 25/26* (2013.01); *F02C 7/12* (2013.01); *F05D 2220/32* (2013.01); *F05D 2220/3213* (2013.01); *F05D 2230/20* (2013.01); *F05D 2230/64* (2013.01); *F05D 2260/20* (2013.01); *F05D 2260/30* (2013.01);

(Continued)

(58) Field of Classification Search
CPC ........ F01D 25/26; F01D 25/28; F01D 25/162; F01D 9/065; F02C 7/12; Y02T 50/676; Y02T 50/671; F05D 2220/32; F05D 2220/3213; F05D 2230/20; F05D 2230/64; F05D 2260/30; F05D 2260/31; F05D 2260/20
USPC ........................................ 60/796; 415/68, 69
See application file for complete search history.

(56) References Cited

U.S. PATENT DOCUMENTS

| 4,825,642 A | 5/1989 | Radtke |
|---|---|---|
| 7,195,447 B2 | 3/2007 | Moniz et al. |

(Continued)

FOREIGN PATENT DOCUMENTS

| EP | 2574737 | 4/2013 |
|---|---|---|
| WO | 2014052007 | 4/2014 |
| WO | 2014105522 | 7/2014 |

OTHER PUBLICATIONS

Extended European Search Report for European Application No. 16154799.7 dated Jun. 21, 2016.

*Primary Examiner* — Ian Paquette
(74) *Attorney, Agent, or Firm* — Carlson, Gaskey & Olds, P.C.

(57) ABSTRACT

A tie rod assembly for a mid-turbine frame includes at least one tie rod for connecting an outer frame case to an inner frame case. At least one tie rod includes an inlet passage that branches into a first branch and a second branch. A plug is located in the first branch to block flow through a portion of the first branch.

20 Claims, 4 Drawing Sheets (52) U.S. Cl.
CPC ......... *F05D 2260/31* (2013.01); *Y02T 50/671* (2013.01); *Y02T 50/676* (2013.01)

(56) References Cited

U.S. PATENT DOCUMENTS

| | | | |
|---|---|---|---|
| 8,061,969 B2 | 11/2011 | Durocher et al. | |
| 8,091,371 B2 | 1/2012 | Durocher et al. | |
| 9,017,029 B2 * | 4/2015 | Pichel | F01D 5/027 416/144 |
| 2006/0093465 A1 | 5/2006 | Moniz et al. | |
| 2008/0134687 A1 | 6/2008 | Kumar et al. | |
| 2010/0135770 A1 | 6/2010 | Durocher et al. | |
| 2011/0079019 A1 | 4/2011 | Durocher et al. | |
| 2011/0081237 A1 | 4/2011 | Durocher et al. | |
| 2013/0094951 A1 | 4/2013 | McCaffrey | |
| 2013/0115079 A1 * | 5/2013 | Farah | F01D 9/06 415/214.1 |
| 2013/0192235 A1 * | 8/2013 | Sanchez | F02C 7/12 60/772 |
| 2013/0219919 A1 | 8/2013 | Suciu et al. | |
| 2014/0000284 A1 | 1/2014 | Scott | |
| 2014/0013770 A1 | 1/2014 | Farah et al. | |
| 2014/0102110 A1 | 4/2014 | Farah et al. | |
| 2014/0227078 A1 | 8/2014 | Chokshi | |
| 2015/0071768 A1 * | 3/2015 | Hugon | F01D 11/001 415/162 |

* cited by examiner

MID-TURBINE FRAME ASSEMBLY FOR A GAS TURBINE ENGINE

BACKGROUND

The present disclosure relates generally to a gas turbine engine, and in particular to a mid-turbine frame (MTF) included in a gas turbine engine.

A gas turbine engine typically includes a fan section, a compressor section, a combustor section, and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section.

A mid-turbine frame (MTF) is positioned between a high pressure turbine stage and a low pressure turbine stage of a gas turbine engine. The MTF supports one or more bearings and transfers bearing loads from an inner portion of the gas turbine engine to an outer engine frame. The MTF also serves to route air from the high pressure turbine stage to the low pressure turbine stage.

SUMMARY

In one exemplary embodiment, a tie rod assembly for a mid-turbine frame includes at least one tie rod for connecting an outer frame case to an inner frame case. At least one tie rod includes an inlet passage that branches into a first branch and a second branch. A plug is located in the first branch to block flow through a portion of the first branch.

In a further embodiment of the above, the first branch extends in a radial direction and the second branch extends in an axial direction.

In a further embodiment of any of the above, the plug includes a flange on a proximal end and a distal end located in the first branch.

In a further embodiment of any of the above, the distal end of the plug is perpendicular to the inlet passage.

In a further embodiment of any of the above, the distal end of the plug includes a slope relative to a proximal end.

In a further embodiment of any of the above, the slope extends radially inward from an upstream side to a downstream side.

In a further embodiment of any of the above, the proximal end of the plug includes a flange with a non-circular cross section. The tie rod includes an opening for accepting the proximal end of the plug and has a corresponding non-circular cross section.

In a further embodiment of any of the above, the inlet passage includes a first inlet passage surface that has a first diameter and a second inlet passage surface that has a second diameter. The second diameter is greater than the first diameter.

In another exemplary embodiment, a gas turbine engine includes a mid-turbine frame located axially between a first turbine and a second turbine. The mid-turbine frame includes at least one tie rod for connecting an outer frame case to an inner frame case. At least one tie rod includes an inlet passage that separates between a first branch and a second branch. A plug is located in the first branch to block flow through a portion of the first branch.

In a further embodiment of any of the above, the first branch extends in a radial direction and the second branch extends in an axial direction.

In a further embodiment of any of the above, the plug includes a flange on a proximal end and a distal end located in the first branch.

In a further embodiment of any of the above, the distal end of the plug is parallel to an engine axis.

In a further embodiment of any of the above, the distal end of the plug includes a slope relative to an engine axis with the slope extending radially inward from an upstream side to a downstream side.

In a further embodiment of any of the above, the proximal end of the plug includes a flange with a non-circular cross section. The tie rod includes an opening for accepting the proximal end of the plug and has a corresponding non-circular cross section.

In a further embodiment of any of the above, the inlet passage includes a first inlet passage surface having a first diameter and a second inlet passage surface having a second diameter. The second diameter is greater than the first diameter.

In another exemplary embodiment, a method of forming a tie rod for a gas turbine engine includes forming a first portion of an inlet passage through a tie rod with a first diameter. A second portion of the inlet passage is formed with a second diameter.

In a further embodiment of any of the above, the first portion is coaxial with the second portion.

In a further embodiment of any of the above, the method includes locating a plug in the second portion.

In a further embodiment of any of the above, the first portion is radially outward from the second portion.

DETAILED DESCRIPTION

Figure 1:
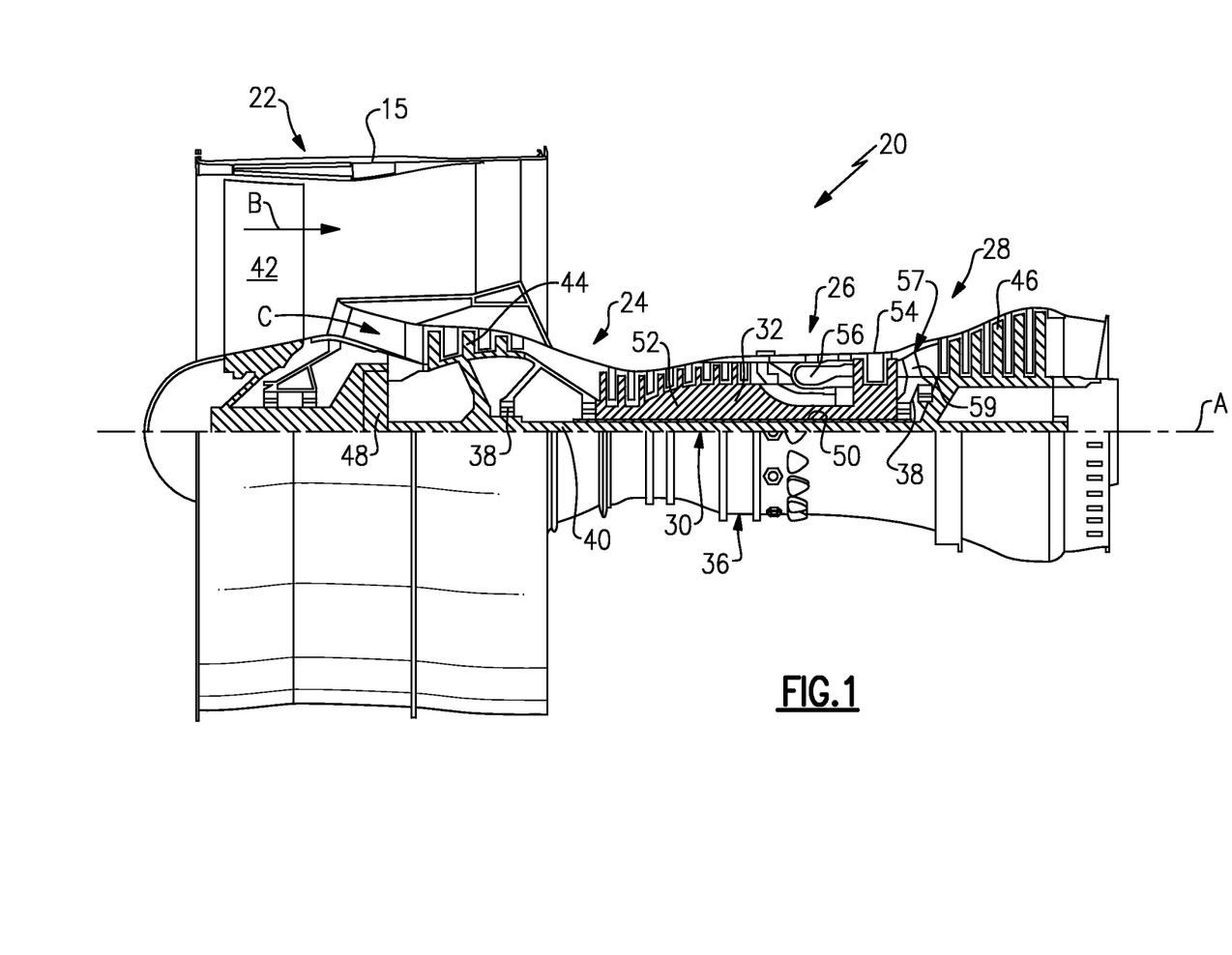
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram }^\circ \text{ R})/(518.7^\circ \text{ R})]^{0.5}$. The "Low corrected fan tip speed" as disclosed herein according to one non-limiting embodiment is less than about 1150 ft/second (350.5 meters/second).

The example gas turbine engine includes fan 42 that comprises in one non-limiting embodiment less than about 26 fan blades. In another non-limiting embodiment, fan section 22 includes less than about 20 fan blades. Moreover, in one disclosed embodiment low pressure turbine 46 includes no more than about 6 turbine rotors schematically indicated at 34. In another non-limiting example embodiment low pressure turbine 46 includes about 3 turbine rotors. A ratio between number of fan blades 42 and the number of low pressure turbine rotors is between about 3.3 and about 8.6. The example low pressure turbine 46 provides the driving power to rotate the fan section 22 and therefore the relationship between the number of turbine rotors 34 in low pressure turbine 46 and number of blades 42 in fan section 22 disclose an example gas turbine engine 20 with increased power transfer efficiency.

Figure 2:
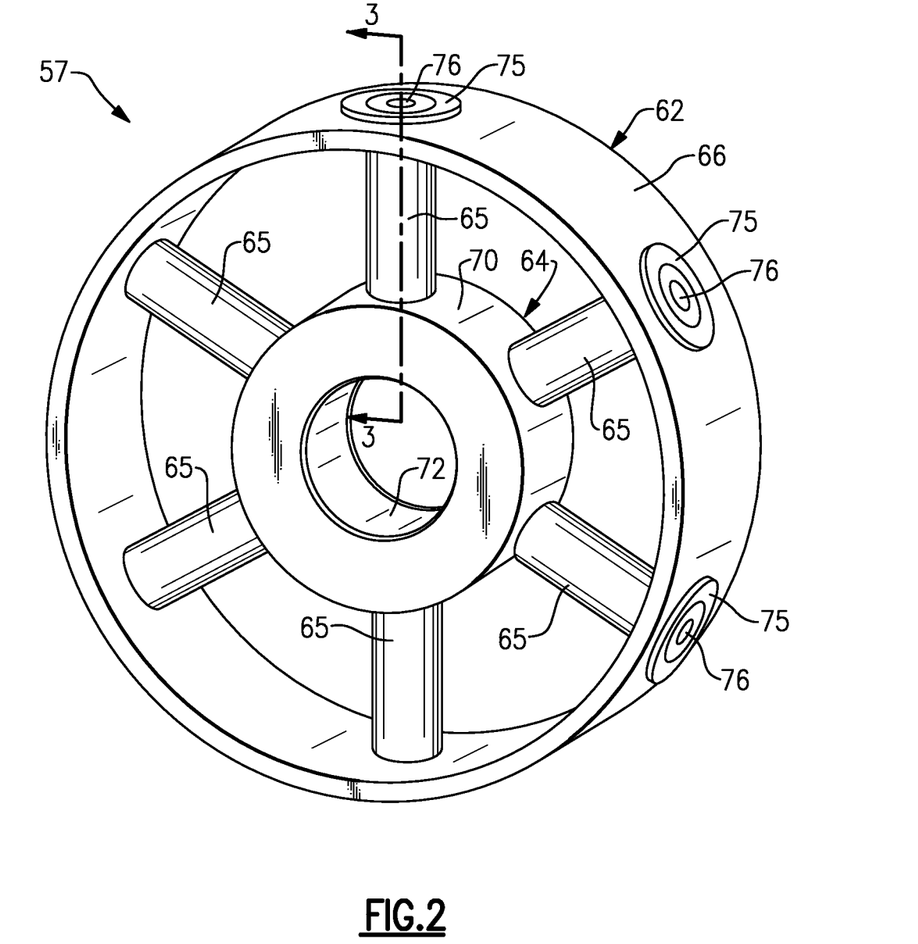
FIG. 2 is a schematic perspective view of an example mid-turbine frame in the gas turbine engine.

FIG. 2 is a schematic perspective view of one embodiment of the mid-turbine frame 57. The schematic view shown in FIG. 2 is high level conceptual view and is intended to illustrate relative positioning of various components, but not actual shape of various components. The mid-turbine frame 57 includes an outer frame case 62, an inner frame case 64, and a plurality of hollow spokes 65. The outer frame case 62 includes an outer diameter surface 66. The inner frame case 64 includes an outer diameter surface 70 and an inner diameter surface 72. In the embodiment shown in FIG. 2, six hollow spokes 65 are distributed around the circumference of the inner frame case 64 to provide structural support between the inner frame case 64 and the outer frame case 62. In alternative embodiments, the mid-turbine frame 57 can have more or less than 6 hollow spokes.

The inner frame case 64 supports the rotor assembly via the bearing systems 38 (shown in FIG. 1), and distributes the force from the inner frame case 64 to the outer frame case 62 via the plurality of hollow spokes 65. Attachment of the hollow spokes 65 to the outer frame case 62 is provided at a plurality of bosses 75 located circumferentially around the outer diameter surface 66 of the outer frame case 62.

In one embodiment, attachment of the hollow spokes 65 at the plurality of bosses 75 may be secured by a retaining nut 106 (shown in FIG. 3) that allows the hollow spokes 65 to be tensioned. The hollow spokes 65 can be tensioned via a threaded connection so as to remain in tension during substantially all operating conditions of gas turbine engine 20. Apertures 76 formed in each of the plurality of bosses 75 allow cooling airflow to be distributed into a hollow portion of each of the hollow spokes 65. In this way, the cooling airflow is directed from the outer diameter through the hollow portions of the cooled hollow spokes 65 towards the inner frame case 64. The cooling airflow can function to cool the hollow spokes 65 and also to cool components radially inward of the inner frame case 64, such as the bearings systems 38. The cooling airflow is then directed to the low-rotor cavity 126 to cool the turbine rotors.

Figure 3:
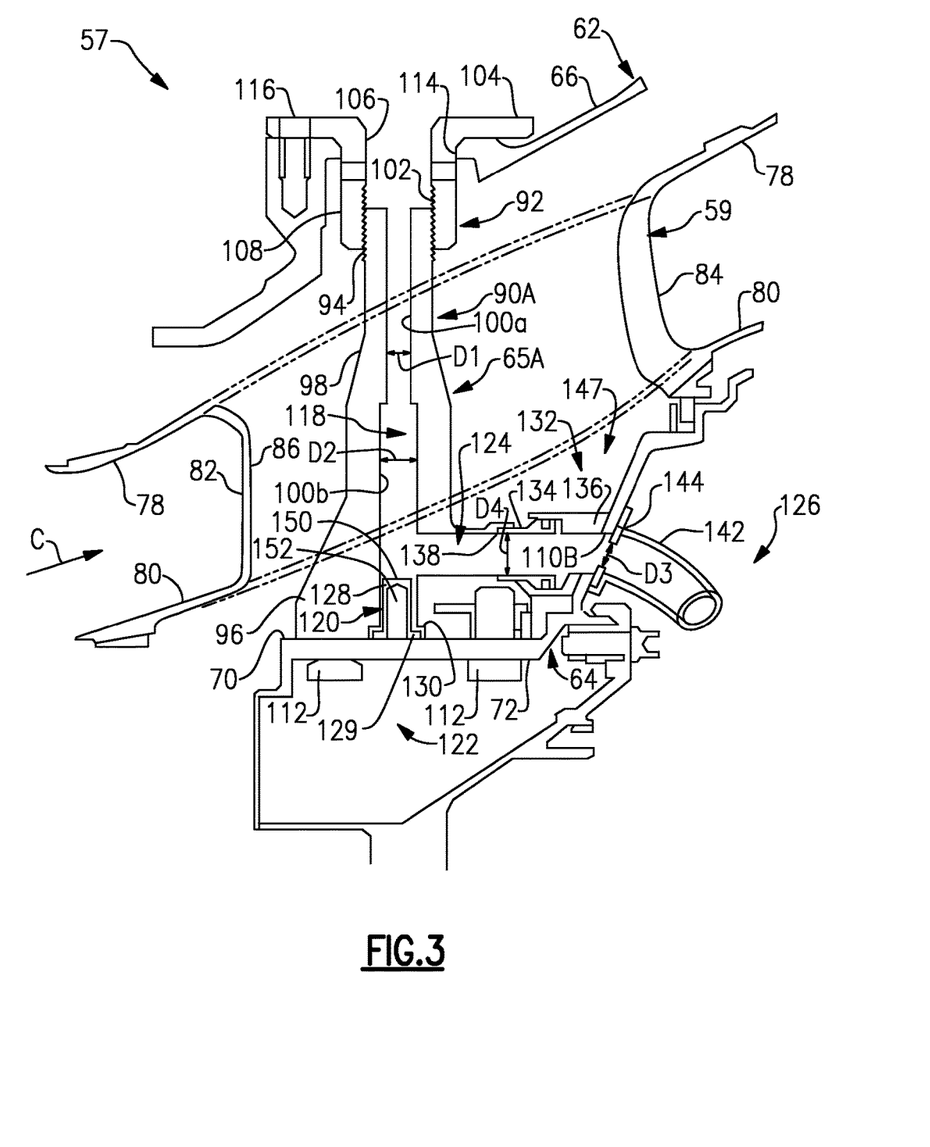
FIG. 3 is a cross-sectional view taken along line 3-3 of FIG. 2.

FIG. 3 is a cross-sectional view of the mid-turbine frame 57 taken along line 3-3 of FIG. 2. A hollow spoke 65A is one example of the hollow spokes 65 shown in FIG. 2. The hollow spoke 65A extends from the outer frame case 62 through the airfoil 59 to the inner frame case 64. The airfoil 59 extends from an outer platform 78 to an inner platform 80. In the illustrated embodiment, the airfoil 59, the outer platform 78, and the inner platform 80 are integrally formed, and are all positioned radially inward of the outer frame case 62 and radially outward of the inner frame case 64. The airfoil 59, the outer platform 78, and the inner platform 80 define a portion of the core flow path C at the mid-turbine frame 57. The airfoil 59 extends axially from a leading edge 82 to a trailing edge 84. The airfoil 59 is oblong so as to be longer in the axial direction than in the circumferential direction. The airfoil 59 has a hollow interior 86, which is also relatively narrow in a chordal direction.

In the illustrated embodiment, the hollow spoke 65A includes a tie rod 90A and a retaining nut 92. The tie rod 90A is an elongated hollow tube that includes a threaded surface 94 at a radially outer end and a flange 96 at a radially inner end. The threaded surface 94 is on an outer surface 98 of the tie rod 90A. A first inlet passage surface 100a and a second inlet passage surface 100b of the tie rod 90A define an inlet passage 118 through the tie rod 90A. The first inlet passage surface 100a defines a diameter D1 that is less than a diameter D2 defined by the second inlet passage surface 100b. Because the tie rod 90A tapers along its length from the flange 96 at its radially inner end to the threaded surface 94 at its radially outer end, the diameter D2 can be larger than the diameter D1 to reduce the weight of the tie rod 90A.

The first passage surface 100a and the second passage surface 100b are coaxial and formed by a tool, such as a drill. The first passage surface 100a of the inlet passage 118 creates a first portion of the inlet passage 118 and is formed by a tool having a diameter approximately equal to the diameter D1 and enters from a radially outer end of the tie rod 90A. The second passage surface 100b of the inlet passage 118 creates a second portion of the inlet passage 118 and is formed by a tool having a diameter approximately equal to the diameter D2 and enters from a radially inner end of the tie rod 90A.

The retaining nut 92 includes a threaded surface 102 at a radially inner end of the retaining nut 92 and a flange 104 at a radially outer end of the retaining nut 92. The threaded surface 102 is on an inner surface 106 of the retaining nut 92. The flange 104 extends outward from an outer surface 108 of the retaining nut 92.

In the illustrated embodiment, the flange 96 of the tie rod 90A abuts against the inner frame case 64. The flange 96 is attached to the inner frame case 64 via threaded fasteners 112, such as bolts. The retaining nut 92 extends through a hole 114 in the outer frame case 62 such that the flange 104 abuts against the outer diameter surface 66 of the outer frame case 62. The flange 104 is attached to the outer frame case 62 via a bolt 116. The bolt 116 extends through the flange 104 into the outer frame case 62. The tie rod 90A is threaded into the retaining nut 92 to attach the tie rod 90A to the retaining nut 92. In the illustrated embodiment, a portion but not all of the threaded surface 94 overlaps with a portion but not all of the threaded surface 102.

During assembly, the tie rod 90A is inserted through the hollow interior 86 of the airfoil 59 in a direction from radially inward to radially outward. The inner frame case 64 is then positioned radially inward of the tie rod 90A and attached to the tie rod 90A by the threaded fasteners 112. The retaining nut 92 is then inserted through the hole 114 and threadedly engaged with the tie rod 90A. The retaining nut 92 can be tightened, as desired, in a manner described below. Once the retaining nut 92 is suitably tightened on the tie rod 90A, the bolt 116 is inserted to fix the retaining nut 92 to the outer frame case 62 to prevent the retaining nut 92 from rotating and loosening.

Because the threaded surface 94 overlaps with the threaded surface 102 only partially, the threaded connection between the retaining nut 92 and the tie rod 90A is variable. The retaining nut 92 does not bottom out at any particular point when threaded on the tie rod 90A. This allows the retaining nut 92 to be threaded on the tie rod 90A to an extent determined during assembly, not predetermined prior to assembly. This allows the hollow spoke 65A and the mid-turbine frame 57 in general, to be relatively insensitive to manufacturing tolerances.

The inlet passage 118 branches off between a first branch 120 extending radially inward and a second branch 124 extending into a low-rotor cavity 126 axially downstream of the inlet passage 118. Because the first branch 120 is also defined by the second inlet passage surface 100b, the inlet passage 118 and the first branch can be formed by a simplified manufacturing process, such as drilling from opposite ends of the tie rod 90A.

A plug 128 is located in the first branch 120 to reduce the accumulation of oil or debris in the first branch 120. The plug 128 includes a flange 129 on a proximal or radially inner end that is accepted within an opening 130 in the tie rod 90A adjacent the outer diameter surface 70 of the inner frame case 64. Although the plug 128 is shown contacting the tie rod 90A and the inner frame case 64, the plug 128 could be spared from the inner frame case 64. The plug 128 can be press fit, brazed, or welded into the tie rod 90A. Alternatively the plug 128 could be a loose fit into the tie rod 90A and radially trapped in place between the tie rod 90A and inner frame case 64 by the flange 129.

The plug 128 includes a distal or radially outer end 150 that is parallel to the engine axis A and perpendicular to the inlet passage 118. A recessed portion 152 removes excess material from the plug 128 to reduce the weight of the plug 128 and make the plug hollow. The recessed portion 152 could be threaded to allow for removal tooling to extract the plug 128. In another example, the plug 128 is made of a solid continuous piece of material.

The second branch 124 extends in an axially downstream direction perpendicular to the first branch 120. Although the second branch 124 is shown being perpendicular to the first branch 120, the second branch 124 could be within 30 degrees of being perpendicular to the first branch 120. The second branch 124 is in fluid communication with the low rotor cavity through to a fitting 132 that extends through the inner frame case 64 and connects to a swirler tube 142.

Figure 4:
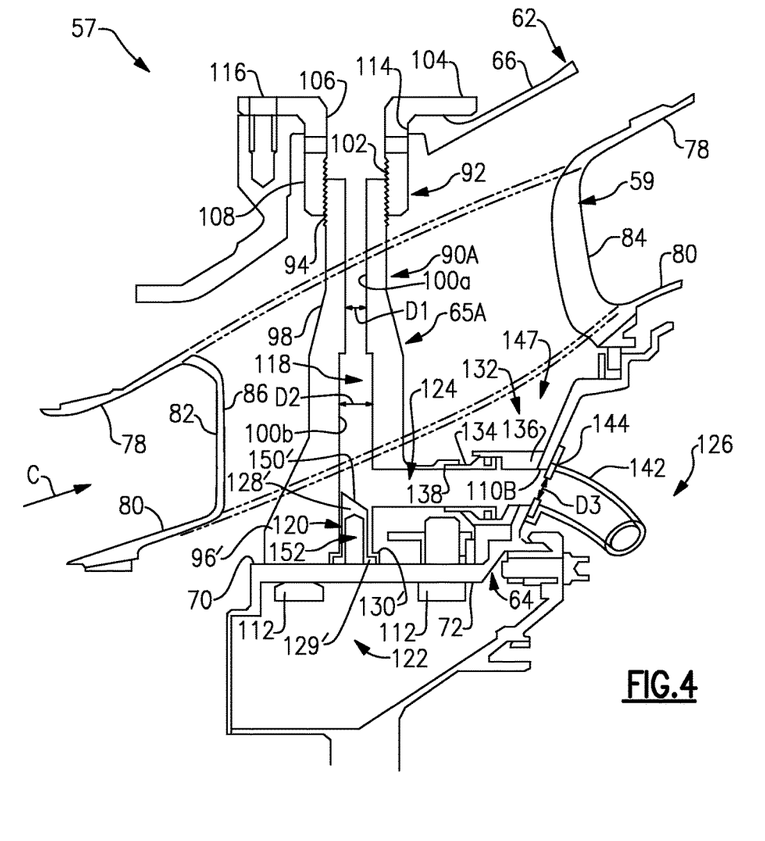
FIG. 4 is a cross-sectional view of another example mid-turbine frame.
Figure 5:
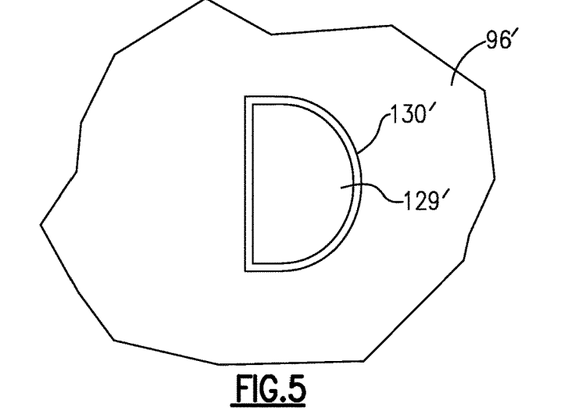
FIG. 5 is an end view of an example tie rod.

The fitting 132 includes a transfer tube 134 pressed, welded, or brazed into an opening 138 in the hollow spoke 65A on a first end and engages a cup boss 136 on a second end. The transfer tube 134 could also be an integral part of the cup boss 136. A piston ring creates a seal between an outer diameter of the transfer tube 134 and the cup boss 136. As shown in FIGS. 4 and 5, the cup boss 136 is fastened to the inner frame case 64 with fasteners 140 and is aligned with a hole 110 in the inner frame case 64. The fasteners 140 also secure the swirler tube 142 to an opposite side of the inner frame case 64 from the cup boss 136. The swirler tube 142 directs the cooling airflow into the low rotor cavity in the direction of rotation of the low rotor to reduce turning and aerodynamic losses in the cooling airflow. By pre-swirling the cooling air flow prior to entering the low-rotor cavity 126, the heat up of the cooling air flow is reduced which lowers a temperature of the low-rotor cavity.

A restricting ring 144 is located between the swirler tube 142 and the inner diameter surface 72. The restricting ring 144 includes a diameter D3 which is smaller than a diameter D4 of the second branch 124. The restricting ring 144 restricts the amount of cooling airflow through the second branch 124 to aid in dividing the amount of cooling airflow traveling into the bearing support cavity 122 and the low-rotor cavity 126. Although the restricting ring 144 is shown between the swirler tube 142 and the inner frame case 64, the restricting ring 144 could be located anywhere within the second branch 124 to reduce the cooling airflow into the low-rotor cavity 126. Alternatively, or in addition to the restricting ring 144, a portion of the second branch 124 may include a portion with a reduced diameter, such as reducing a diameter of the second branch 124 extending through the transfer tube 134, the cup boss 136, or the hole 110 to meter the cooling airflow.

FIG. 4 illustrates another example plug 128' located in a tie rod 90A'. The plug 128' and the tie rod 90A' are similar to the plug 128 and the tie rod 90A except where described below or shown in the Figures. The plug 128' is located in the first branch 120. The plug 128' includes a flange 129' on a proximal or radially inner end that is accepted within an opening 130' in the tie rod 90A' adjacent the outer diameter surface 70 of the inner frame case 64.

The plug 128' includes a distal or radially outer end 150 that slopes radially inward from an upstream side of the plug 128' to a downstream side of the plug 128' to aid in directing the cooling airflow from the inlet passage 118 to the second branch 124. Although the slope of the distal end 150 is constant as shown in FIG. 4, the radially outer end 150 could include a curved surface or an axially upstream portion with a greater slope then an axially downstream portion with a lesser slope. In one example, the slope of the distal end 150 relative to the proximal end or the engine axis A is between 20 and 65 degrees. In another example, the slope of the distal end 150 is between 35 and 55 degrees.

As shown in FIG. 5, a flange 129' of the plug 128' includes a non-circular shape, such as a D shape, to ensure sure that the plug 128' is placed in an opening 130' in the flange 96' of the tie rod 90A' in a proper orientation such that the plug 128' does not block the cooling airflow traveling from the inlet passage 118 to the second branch 124. The flange 129' could also perform this function with a circular flange having a protruding tab that corresponds to a slot in the tie rod 90A.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A tie rod assembly for a mid-turbine frame comprising:
   at least one tie rod for connecting an outer frame case to an inner frame case, wherein the at least one tie rod includes an inlet passage branching into a first branch and a second branch; and
   a plug located in the first branch to block flow through a portion of the first branch.

2. The assembly of claim 1, wherein the first branch extends in a radial direction and the second branch extends in an axial direction and is at least partially defined by the at least one tie rod.

3. The assembly of claim 1, wherein the plug includes a flange on a proximal end having a proximal end surface, a distal end having a distal end surface, and the distal end surface is located in the first branch.

4. The assembly of claim 3, wherein the distal end surface of the plug is perpendicular to a longitudinal axis of the inlet passage.

5. The assembly of claim 3, wherein the distal end surface of the plug includes a slope relative to the proximal end surface and the distal end surface is at least partially radially aligned with the second branch.

6. The assembly of claim 5, wherein the slope is transverse relative to the proximal end and extends radially inward from an upstream side to a downstream side.

7. The assembly of claim 5, wherein the proximal end of the plug includes a flange with a non-circular cross section and the tie rod includes an opening for accepting the proximal end of the plug having a corresponding non-circular cross section.

8. The assembly of claim 1, wherein the inlet passage includes a first inlet passage surface having a first diameter and a second inlet passage surface having a second diameter, wherein the second diameter is greater than the first diameter.

9. A gas turbine engine comprising:
   a mid-turbine frame located axially between a first turbine and a second turbine, the mid-turbine frame including:
      at least one tie rod for connecting an outer frame case to an inner frame case, wherein the at least one tie rod includes an inlet passage separating between a first branch and a second branch; and
      a plug located in the first branch to block flow through a portion of the first branch.

10. The gas turbine engine of claim 9, wherein the first branch extends in a radial direction and the second branch extends in an axial direction and is at least partially defined by the at least one tie rod.

11. The gas turbine engine of claim 9, wherein the plug includes a flange having a proximal end surface on a proximal end, a distal end surface on a distal end, and the distal end surface is located in the first branch.

12. The gas turbine engine of claim 10, wherein the distal end surface of the plug is parallel to an engine axis.

13. The gas turbine engine of claim 10, wherein the distal end surface of the plug includes a slope transverse relative to an engine axis with the slope extending radially inward from an upstream side to a downstream side.

14. The gas turbine engine of claim 13, wherein the proximal end of the plug includes a flange with a non-circular cross section and the tie rod includes an opening for accepting the proximal end of the plug having a corresponding non-circular cross section.

15. The gas turbine engine of claim 10, wherein the inlet passage includes a first inlet passage surface having a first diameter and a second inlet passage surface having a second diameter, wherein the second diameter is greater than the first diameter.

16. A method of forming a tie rod for a gas turbine engine comprising:
   forming a first portion of an inlet passage through a tie rod with a first diameter; and
   forming a second portion of the inlet passage with a second diameter.

17. The method of claim 16, wherein the first portion is coaxial with the second portion.

18. The method of claim 17, further comprising locating a plug in the second portion.

19. The method of claim 18, wherein the first portion is radially outward from the second portion.

20. The method of claim 16, further comprising forming a branch in the tie rod extending in an axial direction in fluid communication with the inlet passage.

* * * * *